(12) United States Patent
Arkin et al.

(10) Patent No.: US 6,833,507 B2
(45) Date of Patent: Dec. 21, 2004

(54) MAGNETIC CORD RETAINER

(75) Inventors: David M. Arkin, Glenview, IL (US); Michael Knapp, Mundelien, IL (US)

(73) Assignee: Xentris, LLC, Addison, IL (US)

( * ) Notice: Subject to any disclaimer, the term of this patent is extended or adjusted under 35 U.S.C. 154(b) by 0 days.

(21) Appl. No.: 10/065,870

(22) Filed: Nov. 26, 2002

(65) Prior Publication Data

US 2004/0099437 A1 May 27, 2004

(51) Int. Cl.$^7$ ................................................. H01B 7/00
(52) U.S. Cl. ................... 174/135; 174/178; 174/153 R; 174/138 E; 24/303
(58) Field of Search ................. 174/135, 178, 174/153 R, 138 E; 24/303

(56) References Cited

U.S. PATENT DOCUMENTS

| | | | |
|---|---|---|---|
| 3,041,697 A | * | 7/1962 | Budreck ........................ 24/303 |
| 5,014,946 A | | 5/1991 | Gruber |
| 5,130,899 A | | 7/1992 | Larkin et al. |
| 5,572,773 A | | 11/1996 | Bauer |
| 5,573,422 A | | 11/1996 | Lawliss |
| 5,682,653 A | | 11/1997 | Berglof et al. |
| 5,722,126 A | | 3/1998 | Reiter |
| 5,895,018 A | | 4/1999 | Rielo |
| 5,933,926 A | | 8/1999 | Reiter |
| 5,983,464 A | | 11/1999 | Bauer |
| 6,076,790 A | | 6/2000 | Richter |
| 6,293,509 B1 | | 9/2001 | Richter |
| 6,379,178 B1 | | 4/2002 | Jones, III et al. |
| 6,405,983 B1 | | 6/2002 | Goj |

* cited by examiner

Primary Examiner—Dean A. Reichard
Assistant Examiner—Jinhee Lee
(74) Attorney, Agent, or Firm—Babcock IP, LLC

(57) ABSTRACT

A cord retainer having a first portion containing a first magnet, the first portion attachable to the cord; and a second portion containing either a second magnet or a ferrous member, the second portion attachable to the cord or having an adhesive surface for attaching the second portion to a desired surface. The first portion and second portion are connectable to each other via magnetic attraction between the first magnet and either the second magnet or the ferrous member.

1 Claim, 3 Drawing Sheets

MAGNETIC CORD RETAINER

BACKGROUND OF INVENTION

1. Field of the Invention

The invention generally relates to a cord retainer apparatus. Specifically, the invention relates to a cord retainer having at least two portions, each portion configured for mounting upon a cord, the portions attachable to each other via magnetic attraction.

2. Description of Related Art

Cords of many types have a length designed for ease of use. However, when not in use the cord may become damaged, a nuisance and or a safety hazard if not collected into a compacted and or secured configuration.

Power supply cords of, for example, cellular telephones used in automobiles are commonly long enough for the user to operate the telephone while driving, i.e. at least the distance from the users head to the vehicle cigarette lighter socket/12V outlet. When not in use, the phone may be stored on or near the cigarette lighter socket/12V outlet, allowing the cord to collect close to automobile controls and or the users foot area where the cord may be damaged or cause a safety hazard. Another cord with similar problems is a microphone cord for mobile and marine radios. Also, the hands-free microphone/earphone cords for cellular telephones are easily damaged/tangled when not worn by the user in the ready position.

Therefore, it is an object of the invention to provide an apparatus that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
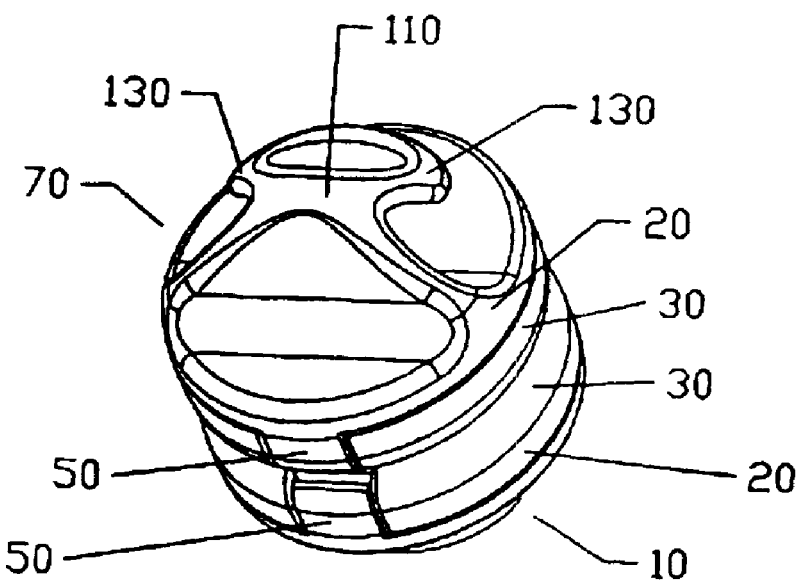
FIG. 1 is an isometric view of one embodiment of the invention, with the two portions coupled together.
Figure 2:
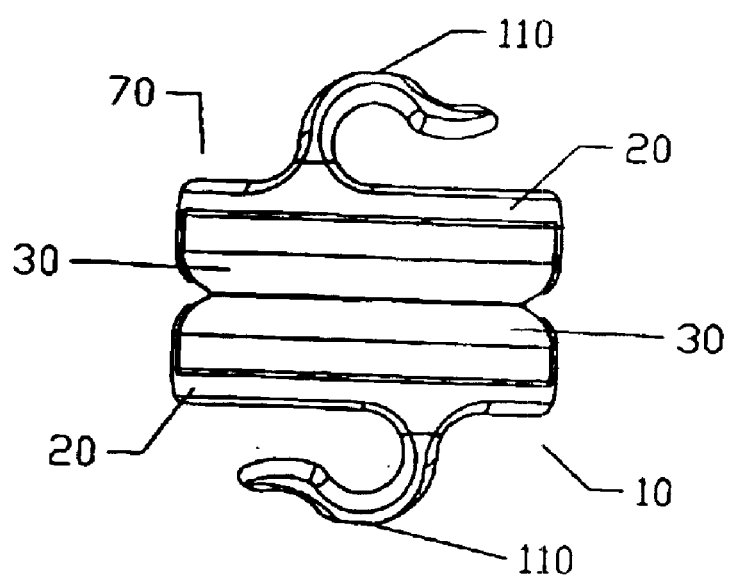
FIG. 2 is a side view of the embodiment of the invention shown in FIG. 1.
Figure 3:
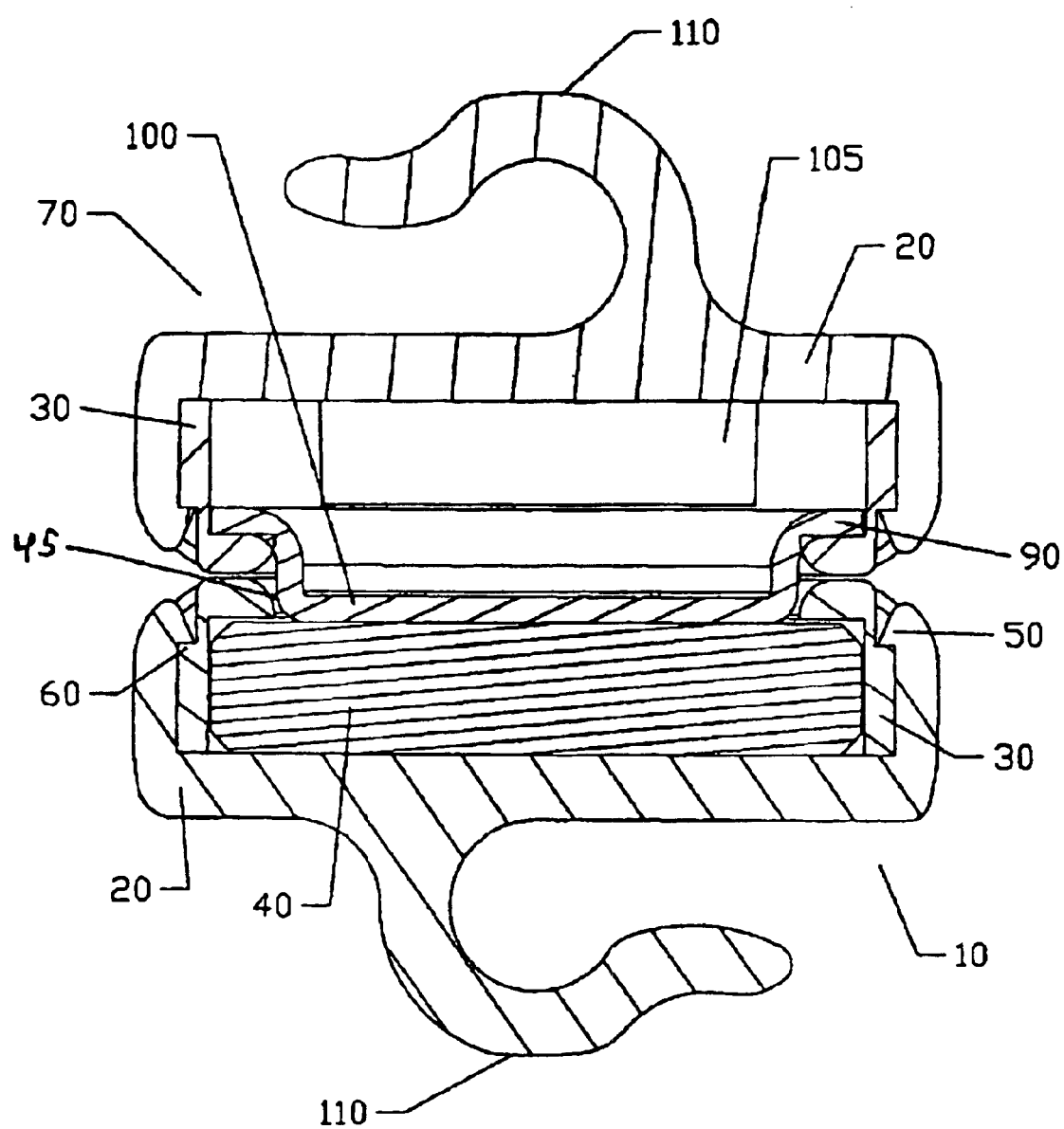
FIG. 3 is a cutaway side view of the embodiment of the invention shown in FIG. 1.
Figure 4:
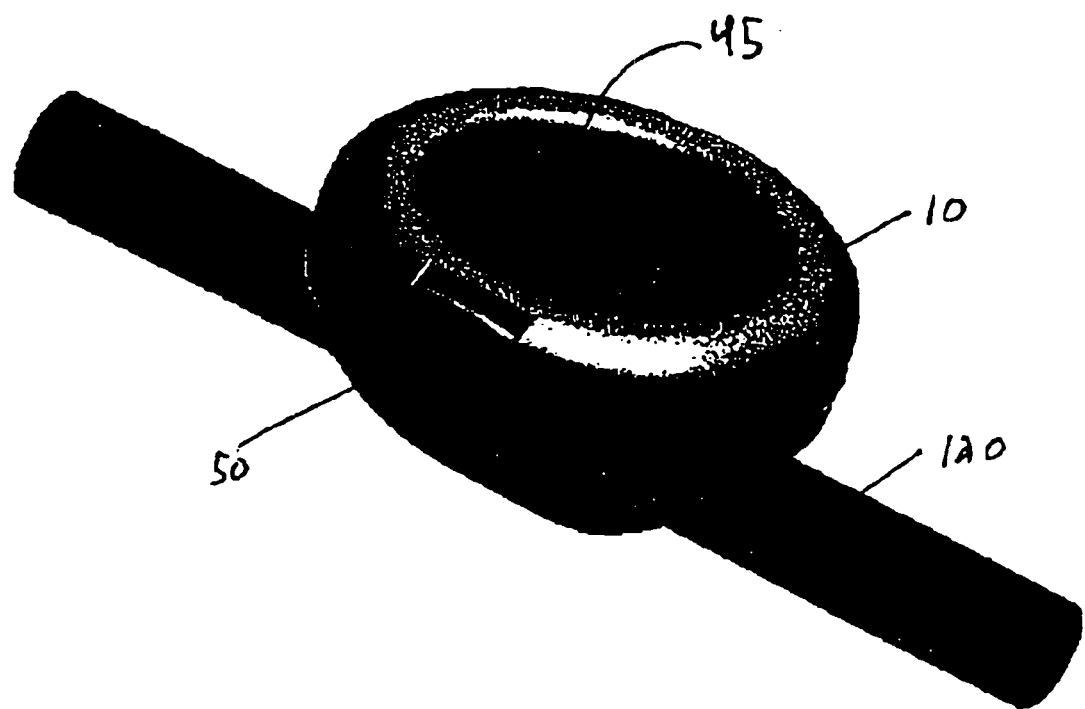
FIG. 4 is an isometric top view of the first portion of the embodiment of the invention shown in FIG. 1.
Figure 5:
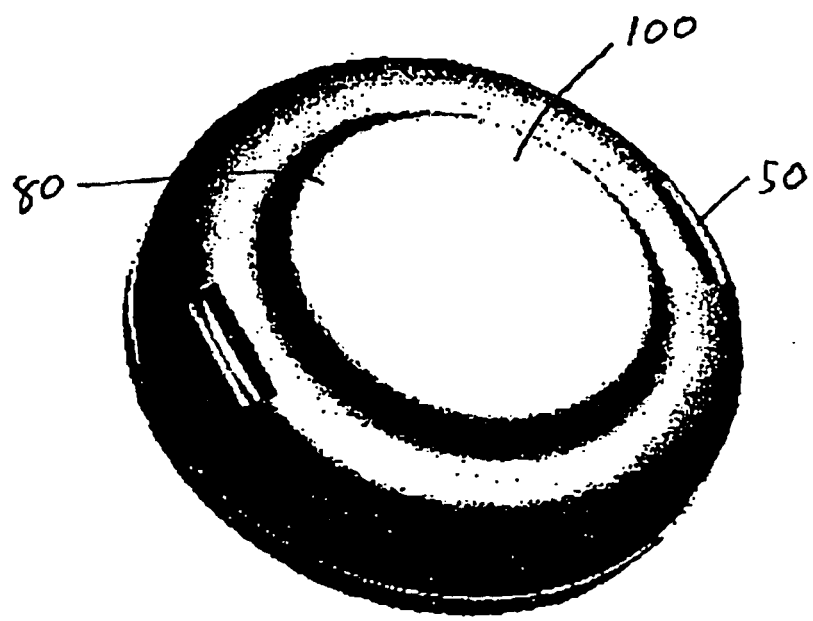
FIG. 5 is an isometric top view of the second portion of the embodiment of the invention shown in FIG. 1.

One embodiment of the invention is shown in FIGS. 1–5. A cord retainer may be formed from two halves. A first portion 10 is formed from a body 20 configured to mate with a retaining member 30. The retaining member 30 is configured to contain a magnet 40. When the body 20 is mated with the retaining member 30, the magnet 40 is securely held within the body 20. An aperture 45 in the retaining member 30 or body 20 forms a female portion that may be used to allow a flat portion of the magnet 40 to be externally accessible. The body 20 and retaining member 30 may be mated together via at least one hook 50 and corresponding ledge 60 formed in the body 20 and retaining member 30. Alternative mating configurations between the body 20 and the retaining member 30 may include pins/sockets, threaded and or adhesive interconnection. The body 20 and retaining member 30 may be formed from, for example, plastic, acrylic or polycarbonate material.

A second portion 70 may also use a body 20, retaining member 30 and magnet 40. Rather than another magnet 40, arranged in a reverse polarity orientation with respect to the magnet 40 in the first portion 10, the second portion 70 may hold a ferrous member 80. Configured with a rim 90 dimensioned for retention by the retaining member 30, the ferrous member 80 may have a raised contact area 100 that extends beyond the retaining member 30 creating a male portion. A support member 105 may be used to maintain the rim 90 against the retaining member 30.

The magnet 40 of the first portion 10 attracts the ferrous member 80 or magnet 40 of the second portion 70. When the first portion 10 and the second portion 70 are brought together, the raised contact area 100 may extend into the aperture 45, if present, and be held by magnetic force close to or in contact with the magnet 40, whereby the first portion 10 and the second portion 70 are detachably held together. The fit of the raised contact area 100 into the aperture 45 increases the force required to separate the first portion 10 from the second portion 70 by preventing a separation direction that is perpendicular to the magnetic field of the magnet 40.

The magnet 40 may be any form of magnet. Suitable magnet materials include ferromagnetic material, for example, flexible rubber, iron, nickel, cobalt, Nd—FE—B, alnico, ceramic and neodymium. The magnetic strength of the magnet may be selected based upon the projected weight of the cord(s) to be retained and desired separation force. Use of the male first portion 10 mating to the female second portion 70 design allows the selected magnet 40 to have a lower magnetic flux requirement, allowing use of smaller and or cheaper magnets. The ferrous member 80 may be any ferrous alloy, attractable by magnetic force or may be a second magnet. A coating, for example chrome or nickel plating, may be added to the ferrous member 80 and or magnet 40 to prevent oxidation and or improve cosmetic appearance.

A clip 110 is dimensioned to mate with a desired cord 120 diameter. The body 20 may be formed, for example by injection molding, integral with the clip 110, from a material that provides the clip 110 with resilient properties allowing connection and removal of a range of different diameter cord(s) 120 from the clip 110. The clip 110 may be formed with retaining tabs 130. The retaining tabs 130 provide a stop for the cord 120, rather than allowing it to be pulled against the relatively weak retaining force of the clip 110, improving cord 120 retention by the clip 110.

Alternatively, the clip 110 may be separately formed, for example from spring steel, and attached to the body 20. Clip(s) 110 may also be spring loaded, for example having an alligator clip configuration. Also, one of the first and second portions may be configured to attach to a surface instead of the cord. For example, one of the portions may be supplied with an adhesive backing or mechanical fastener for attachment to a dashboard, bulkhead or other point where the other portion may be coupled to, in order to locate a loop of the cord 120 in a desired location.

In use, multiple sets of the cord 120 retainers may be used on an individual cord 120. Spaced apart, each cord 120 retainer pair can collect and retain a loop of the cord 120 having a desired length with the multiple loops collected in the desired loop size to fit the overall cord 120 length and desired retained cord 120 density. Where a magnet is in one portion and a ferrous member is used in a the other portion, the magnet containing portion may be placed at the device rather than socket end, allowing the cord to me attached to any available ferrous surface.

As described, the invention provides an inexpensive, unobtrusive and reliable means for retaining a cord. Thereby protecting the cord from damage and or preventing the cord from becoming a safety hazard.

| Table of Parts | |
|---|---|
| 10 | first portion |
| 20 | body |
| 30 | retaining member |
| 40 | magnet |
| 45 | aperture |
| 50 | hook |
| 60 | ledge |
| 70 | second portion |
| 80 | ferrous member |
| 90 | rim |
| 100 | raised contact area |
| 105 | support member |
| 110 | clip |
| 120 | cord |
| 130 | retaining tab |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. An electrical cord retainer apparatus, comprising: a first clip and a second clip, the first clip and the second clip arranged to be attachable to the electrical cord from a direction tangential to a longitudinal axis of the first clip and the second clip, respectively; the first clip and the second clip connectable together via magnetic force, wherein the first clip has a magnet and the second clip has a ferrous member, wherein the ferrous member has a raised contact area and the first clip has a retaining member having one of an indented area and an aperture, wherein the raised contact area and one of the indented area and the aperture are arranged to mate together.

* * * * *